Dec. 22, 1970 J. F. NORTON 3,550,094

SEMICONDUCTOR DATA STORAGE APPARATUS WITH ELECTRON BEAM READOUT

Filed April 1, 1968 2 Sheets-Sheet 1

Inventor:
James F. Norton,
by Marvin Snyder
His Attorney.

Inventor:
James F. Norton,
by Marvin Snyder
His Attorney.

United States Patent Office 3,550,094

Patented Dec. 22, 1970

3,550,094

SEMICONDUCTOR DATA STORAGE APPARATUS WITH ELECTRON BEAM READOUT

James F. Norton, Alplaus, N.Y., assignor to General Electric Company, a corporation of New York Filed Apr. 1, 1968, Ser. No. 717,500
Int. Cl. G11c 11/34
U.S. Cl. 340—173 4 Claims

ABSTRACT OF THE DISCLOSURE

A semiconductor radiation detecting wafer having a pattern of radiation absorbing regions coated over the incident radiation receiving surface is employed as a non-volatile digital data storage device. The pattern of absorbing regions represents stored data. Interrogation is accomplished by controllably deflecting an electron beam over predetermined surface portions of the device such that the beam impinges upon either the semiconductor or a radiation absorbing region. Readout is procured by measuring output current from the semiconductor when the beam is deflected to a desired location.

INTRODUCTION

This invention relates to data storage means, and more particularly to digital data storage devices employing semiconductor radiation detectors shielded by a radiation absorbing coating patterned in accordance with the stored data.

In electron beam data storage and retrieval systems, the recording material is basically either a solid body wherein writing and readout occur on the same surface, or a thin material wherein thickness is altered during the writing process and readout is accomplished by transmission of the electron beam through the material according to the pattern recorded thereon. For systems of the latter type, thin materials available for memories of modest size include metals such as gold, osmium, molybdenum, tantalum, tungsten, halfnium and palladium, the photoresist families, and other dense materials both metallic and non-metallic as well as combinations thereof. However, since these materials should be maintained in thicknesses of no more than a few microns where the electrons are to be prevented from penetrating into a detecting region, the problem of supporting a relatively large area of this material, such as a one-inch square, becomes formidable. A method of overcoming this problem, as described herein, involves coating the thin material directly on an electron collector or detector from which the signals are read out.

Solid state detectors used for nuclear particle detection typically exhibit a current gain of 1,000 to 10,000, depending upon the energy of the electron when it strikes the detector surface. Hence, by use of a thin film wherein the desired digital information is recorded as different thicknesses in the film positioned as a direct overlay on the detector surface, it is possible to read out the recorded areas with a scanning electron beam such as provided by a matrix of electron lenses.

Accordingly, one object of the invention is to provide a device for storing digital data according to a predetermined pattern of electron beam opacity and transmissivity.

Another object is to provide a data storage device wherein read out is provided by formation of electron-hole pairs in predetermined portions of a semiconductor radiation detector.

Another object is to provide a data storage and retrieval system wherein an electron beam is selectively impinged upon predetermined regions of a storage device in order to read data into storage and retrieve data therefrom.

Briefly, in accordance with a preferred embodiment of the invention, a data storage device comprising a semiconductor radiation detecting wafer is provided. The wafer has a flat surface to receive incident radiation thereon, and comprises a p-type region of substantially uniform thickness extending beneath the incident radiation receiving surface to a predetermined depth and an n-type region of substantially uniform thickness extending to a predetermined depth in the wafer beneath the opposite surface thereof, leaving a depletion region between the p-type and n-type regions. A radiation absorbing layer, coated over the incident radiation receiving surface of the wafer, contains a predetermined pattern of openings through which incident radiation can substantially unobstructedly strike the incident radiation receiving surface.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
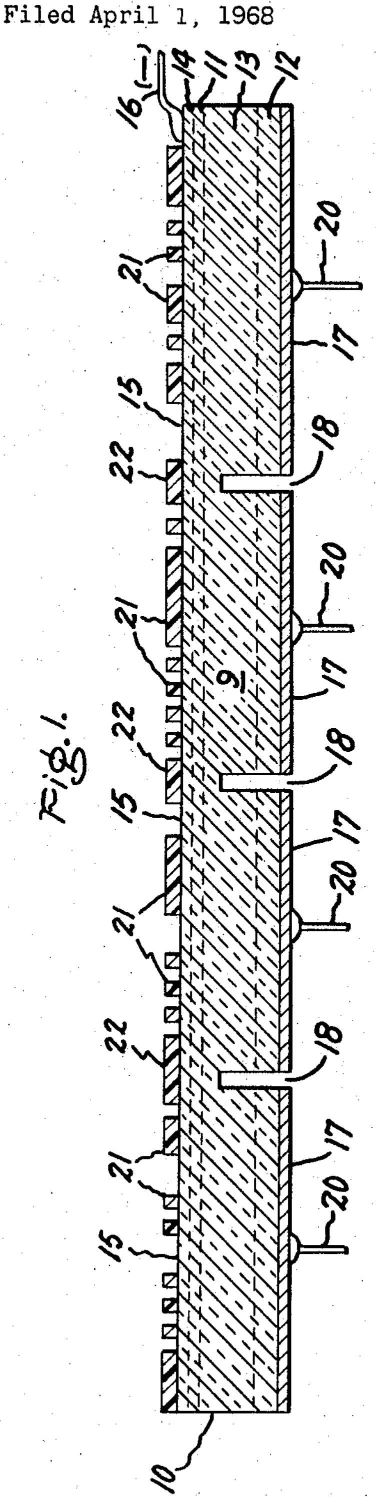
FIG. 1 is a sectional view of the storage device of the instant invention.

FIG. 1 illustrates, in section, a nuclear particle detector 10 such as, for example, a lithium drift detector fabricated of a semiconductor wafer, preferably silicon, such as is well known in the art. Detectors of this type typically comprise a narrow p-type region 11 and a narrow n-type region 12 which are diffused into the wafer from opposite sides so as to leave a wide intrinsic region 13. An additional p-type region 14, which is more heavily doped than p-type region 11 so as to be highly conductive, is diffused into the wafer through surface 15 comprising the surface upon which incident radiation is to impinge. Because of its high conductivity, region 14 facilitates making electrical contact to the incident radiation receiving surface of wafer 10. Since nuclear particle detectors such as lithium drift detectors have been described extensively in the literature and are available commercially from numerous suppliers, fabrication details for these detectors, such as those described by E. M. Pell, Journal of Applied Physics, vol. 31, page 291 (1960) are not repeated herein.

Contact to heavily doped p-type region 14 may be made, for example, by alloying an aluminum wire 16 thereto, while ohmic contact to n-type region 12 may be made by alloying a gold layer 17 over the surface of n-type region 12. If parallel readout of several different banks of stored data is desired, a plurality of grooves 18 may be ultrasonically cut or sawed in wafer 10 in criss-cross fashion. Electrical connection may then be made to each of the individual segments of gold layer 17 by thermocompression bonding of copper leads 20 thereto. It should be noted, however, that if the radiation detector is to be used with but a single readout circuit, grooves 18 would be omitted, leaving the entire rear surface coated with the alloyed gold layer, and a single lead would be connected to the gold layer by thermocompression bonding.

Radiation-receiving surface 15 of wafer 10 is next coated with a material of sufficient density and thickness to absorb incident electron radiation. For example, a photoresist material such as KPR, which is a photopolymerizable substance sold by Eastman Kodak Company, Rochester, N.Y., may be deposited over the entire surface 15 of wafer 10. Preferably, the photoresist material is baked on the surface of wafer 10 for about ½ hour at 65° C., in order to ensure adherence of the photoresist layer to the wafer during the photoresist development process. Final thickness of the photoresist film for typical electron energy levels employed during readout is conveniently about 0.5 micron while, for higher resolution, films as thin as 0.1 to 0.01 micron may be deposited.

Thereafter, an electron beam is made to controllably impinge upon the photoresist coating within a vacuum chamber so as to expose the coating in predetermined regions in accordance with the data to be stored. Once the pattern has thus been recorded on the photoresist material, the photoresist-coated detector is removed from the vacuum chamber and the photoresist is developed according to the photoresist manufacturer's specifications. In the resulting data storage device 9, therefore, photoresist material 21 remains on surface 15 of wafer 10 only in predetermined locations, representing stored data; in other locations, however, the photoresist material has been removed and surface 15 of the wafer is exposed to view. In order to avoid erroneous readings from device 9, large regions of photoresist material 22 are left directly above grooves 18, thereby preventing electrons from impinging upon wafer 10 in the regions directly above grooves 18.

Conveniently, a positive photoresist may be used for fabricating the photoresist pattern since, in this case, photoresist material is removed in the regions where it is exposed to the electron beam. The penetrating electrons which are amplified in detector 10 contribute to heating of the device and, because of the desirability of keeping internal heating in the detector to a minimum, use of a positive photoresist so as to minimize the penetrating electrons is preferable. Electron penetration is minimized because all guard regions and unremoved photoresist material absorb much of the energy of an incident beam of electrons, leaving only small regions where surface 15 of wafer 10 is exposed to incident electrons.

Device 9 provides an output signal when an electron penetrates surface 15 and passes into depletion region 13 of wafer 10. Thus, the penetrating electron beam creates an electron-hole pair for each 3.5 electron volts of energy. An electric field applied across the opposed surfaces of the p-type and n-type regions of wafer 10 so as to reverse bias the wafer drives the carriers normal to the plane of the wafer; that is, electrons are driven toward positive electrodes 17 and holes toward negatively biased region 15. An output voltage pulse is thus produced across leads 16 and 20. On the other hand, substantially no output pulse, or at most a greatly reduced output pulse, is produced when the electron beam is intercepted by a portion of the coating on wafer 10. Accordingly, the output voltage pulse or substantial lack thereof constitutes output data from device 9 in binary form.

Figure 2:
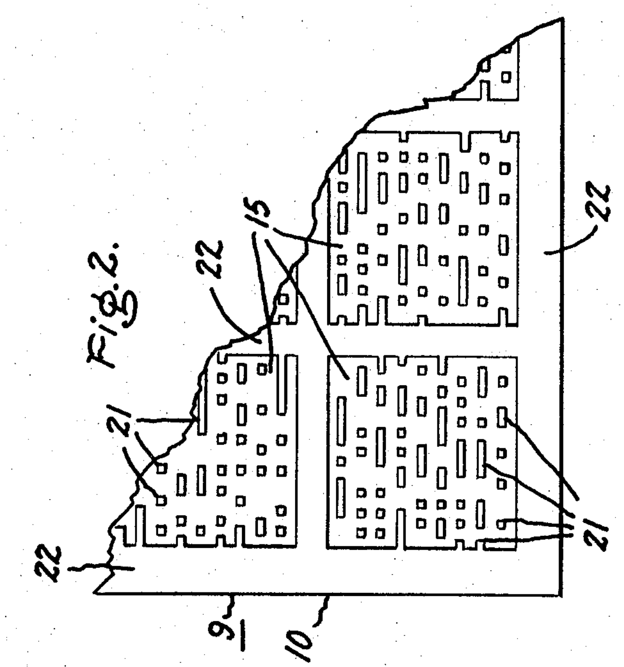
FIG. 2 is a fragmentary plan view of the top surface of one embodiment of the storage device of the instant invention.

FIG. 2 is a fragmentary plan view of the incident radiation receiving surface of device 9 of FIG. 1, showing the photoresist regions 21 and 22 as they appear after development. It should be noted that the holes in the photoresist formed on surface 15 of wafer 10 by impingement of an electron beam thereon may be of a density as high as $10^8$ bits per square centimeter. Alternatively, FIG. 2 may represent a device for storage of data in the form of islands 21 of a dense metal such as gold, osmium, molybdenum, tantalum, tungsten, hafnium, or palladium, instead of photoresist on surface 15 of wafer 10. For example, if islands 21 are comprised of gold, the configuration of FIG. 2 may be readily achieved by the photolytic etching process described by D. L. Schaefer et al. in application Ser. No. 604,541, filed Dec. 27, 1966 and assigned to the instant assignee. According to the Schaefer et al. application, the islands may be formed by depositing a gold film on surface 15 of wafer 10, overlying the gold film with a photodecomposable reagent, and exposing the reagent to activating radiation in the regions where the gold is to be removed in order to form species which are chemically reactive with gold in the presence of alcohol and thus etch away the gold in these regions. In the alternative, this configuration may be achieved by depositing a gold film on surface 15 of wafer 10, and depositing a negative photoresist layer atop the gold film. The photoresist layer may next be exposed to electron beam radiation or light radiation in accordance with the pattern of data to be recorded. The layer of photoresist material is then developed, fixing the exposed photoresist material on the gold layer. The unexposed photoresist material is then removed with a solvent as recommended by the photoresist manufacturer, leaving the gold layer exposed to view, except for islands of exposed photoresist material thereon. Subsequent dissolution of the gold in aqua regia occurs only beneath those unexposed portions of the photoresist material which have been removed in the developing process. Thereafter, when the photoresist material has been removed, the appearance of the gold regions is as illustrated in FIG. 2 and is seen to comprise islands 21 of gold and borders 22 of gold. The electrons of the impinging beam are thus permitted to strike wafer 10 only through those portions of surface 15 unprotected by a gold covering. Similar fabrication procedures may be followed if, instead of gold, islands 21 are fabricated of one of the other enumerated dense metals.

Figure 3:
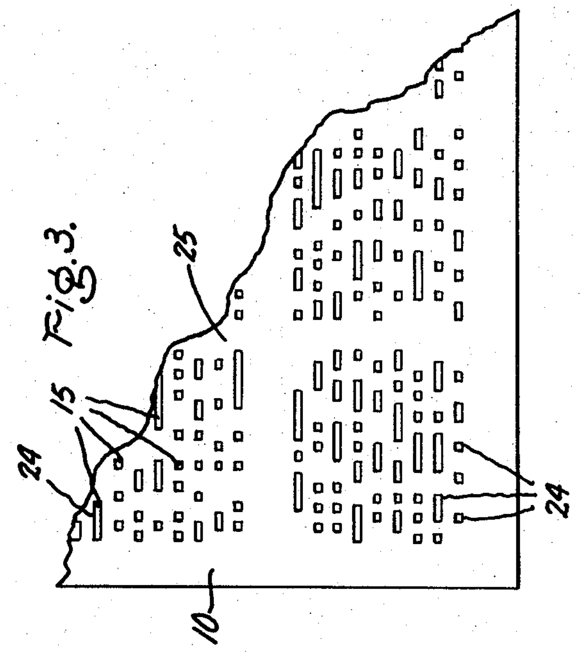
FIG. 3 is a fragmentary plan view of the top surface of a second embodiment of the instant invention.

Alternatively, the storage device of the invention may be fabricated with a continuous layer of photoresist or one of the previously enumerated dense metals deposited over incident radiation receiving surface 15, with holes in the layer to permit passage of electrons therethrough. A continuous pattern of a dense metal such as gold may be preferable to a contiuous pattern of photoresist material, since gold is more absorbent to incident electron radiation. To fabricate a pattern of this type, such as illustrated in FIG. 3, photolytic etching as described in the aforementioned Schaefer et al. application may be employed. In the alternative, the silicon substrate of wafer 10 is uniformly coated with a gold layer evaporated or sputtered thereon, or plated thereon from solution. A layer of positive photoresist material is next deposited over the gold layer and exposed to electron beam radiation or light radiation in accordance with the pattern of data to be recorded. The layer of photoresist material is then developed, fixing the unexposed photoresist material on the gold layer. The exposed photoresist material is then removed with a solvent as recommended by the photoresist manufacturer, leaving portions of the gold layer exposed to view. Next, the unprotected gold is dissolved in aqua regia, so as to leave portions of incident radiation receiving surface 15 exposed to view in accordance with the desired pattern. Finally, the unexposed photoresist material is removed as by rinsing in a commercial photoresist stripper, leaving a pattern as illustrated in FIG. 3 wherein regions 24, which comprise holes in gold layer 25, represent the stored data and are not formed above grooves 18. In this structure, for typical electron energy levels employed during readout, gold layer 25 is conveniently about 3000 angstroms in thickness.

Figure 4:
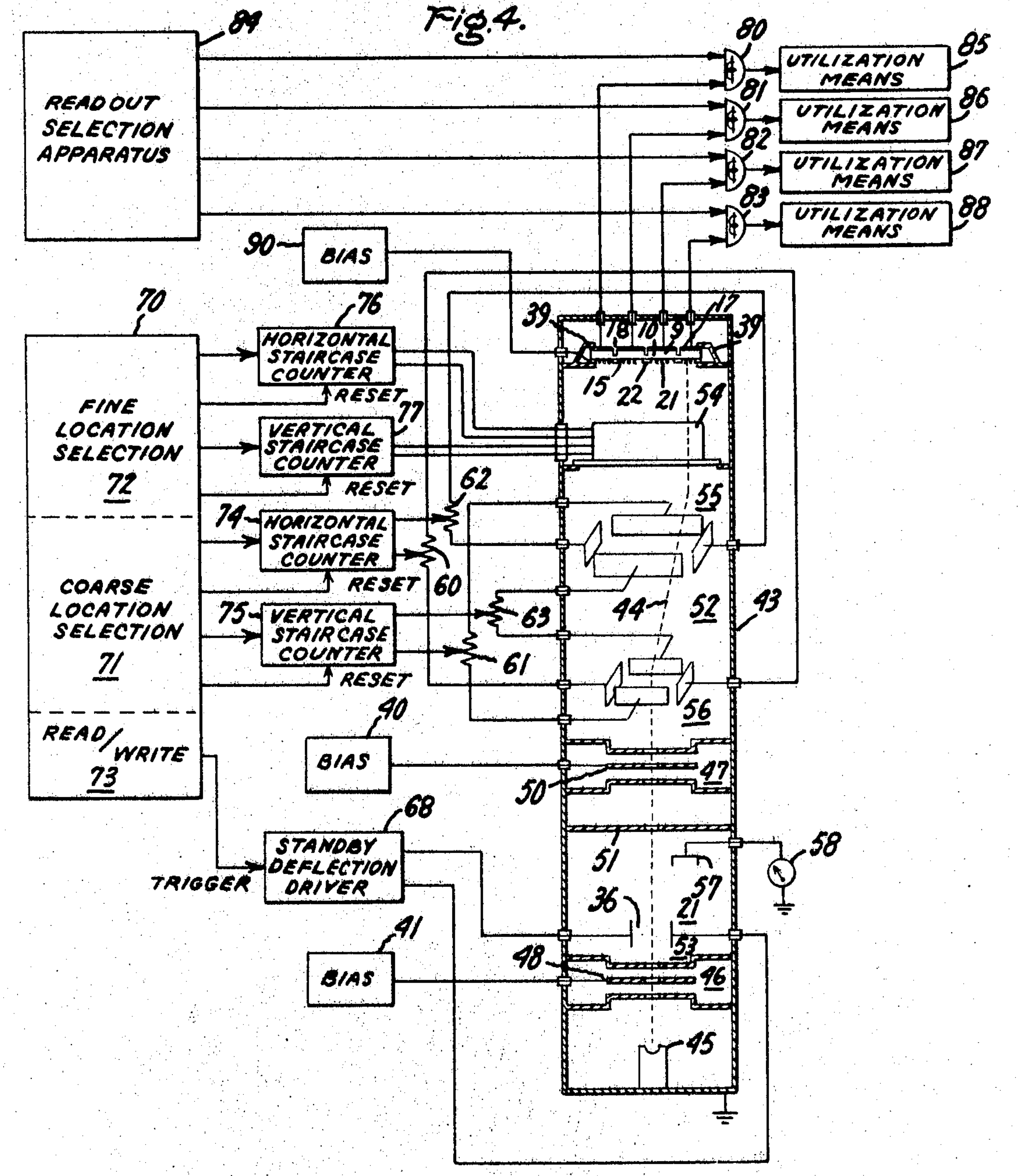
FIG. 4 is a schematic diagram of a data storage and retrieval system employing the data storage device illustrated in FIGS. 1–3.

FIG. 4 illustrates apparatus in which the device illustrated in FIGS. 1 and 2, or 3, may undergo formation of a pattern of data thereon to be stored, and in which the same device subsequently may be interrogated and read out. Thus, a vacuum enclosure 43 is shown containing device 9, depicted in FIGS. 1 and 2, wherein a beam 44 of charged particles, such as an electron beam produced by an electron emitting device 45, is controllably deflected onto surface 15 of wafer 10 or electron absorbing regions 21, in accordance with signals furnished by associated control circuitry 70 to the electron beam control apparatus within enclosure 43. Device 9 can be removed from enclosure 43 and returned accurately to its former position in the enclosure within support means 39 by visual observation of the wafer through a split-objective optical microscope (not shown) situated above the wafer. Additionally, if desired, specific areas of the information storage surface on wafer 10 may be allocated to indexing information which may be read out by the electron beam itself. This information may be employed in making the final adjustments in electron beam position on the wafer. Electron source 45 typically comprises an electron gun of the type shown and described in S. P. Newberry Pat. 3,008,066, issued Nov. 7, 1961, or a dispenser cathode of the type shown and described in P. P. Coppola Pat. 3,016,472, issued Jan. 9, 1962 and H. H. Glascock, Jr., et al. Pat. 3,263,115, issued July 26, 1966, each of these patents being assigned to the instant assignee.

The beam produced by electron source 45 is collimated by a pair of condenser lenses 46 and 47. The central apertured plate 48 and 50 of each of condenser lenses 46 and 47 respectively is connected to a source of negative potential 41 and 40 respectively, while the outer apertured plates of condenser lenses 46 and 47 are grounded through the outer wall of housing 43. The effect of condenser lenses 46 and 47 is such as to modify the electron trajectories by bending the paths of electrons during their passage through the condenser lens so as to bring a group of divergent electron paths into a beam of substantially parallel or slightly convergent paths. Use of condenser lens 46 makes possible utilization of full beam amplitude when a shaped aperture is interposed between the condenser lenses, by concentrating the beam at the shaped aperture in a plate 51. This eliminates the virtual image of the source.

Housing 43 is divided into two sections 52 and 53 by plate 51 having a square or other conveniently shaped aperture formed therein. This results in a similarly shaped cross-sectional area of the electron beam impinging upon a matrix of electron lenses or lenslets 54. This lens matrix, designated a Fly's Eye lens, is described in detail in S. P. Newberry patent application Ser. No. 671,353, filed Sept. 28, 1967, and assigned to the instant assignee. Thus, a reduced image of a square or other shaped aperture is formed on the surface of device 9. Use of an image of a shaped aperture permits production of data patterns having very distinct edge sharpness without severe loss of beam current. This expedites speed of recording, since the time required to fill in an area with a small beam is much greater than that required to expose all this area at once with a beam of just the right size, shape and edge sharpness.

Coarse deflection of the electron beam is accomplished by applying precise deflection voltages to two sets of deflection electrodes 55 and 56, situated within section 52 of enclosure 43 together with condenser lens 47. Each of coarse deflection electrodes 55 and 56 comprises two pairs of mutually orthogonal electrostatic deflection plates although, if preferred, electromagnetic deflection means may be utilized instead of electrostatic deflection means. Electrostatic deflection electrodes 55 and 56 are interconnected with each other through a plurality of resistances 60, 61, 62 and 63, which may conveniently comprise potentiometers. Through these resistances, opposite deflection plates of each of deflection means 55 and 56 receive voltages of the same polarity, although of relative amplitudes determined by the setting of the centertap on the potentiometer interconnecing each pair of opposite plates. Electrical interconnection of opposite plates causes electron deflection in opposite directions at each of deflection means 55 and 56, so that the electron beam impinges only orthogonally upon the lenslets of matrix 54.

When the electron beam impinges upon a lenslet in matrix 54, the beam is deflected according to horizontal and vertical deflection voltages supplied to the matrix. These horizontal and vertical deflection voltages are furnished in common to a respective pair of horizontal and vertical deflection electrodes for each of the lenslets of the matrix, as described in detail in the aforementioned S. P. Newberry application. Thus, once the coarse deflection means comprising deflection electrodes 55 and 56 have deflected the electron beam onto any particular lenslet, the electron beam may be precisely controlled by the horizontal and vertical voltages furnished to that lenslet so as to trace out a predetermined pattern on the recording surface of device 9, which is the surface exposed to the electron beam.

Collimating lenses 46 and 47 have the ability to confine the beam to impinge upon the opening of a single lenselet in electron lens matrix 54, or to be enlarged to cover all of the lenslets of matrix 54 simultaneously. Thus, in the event the electron beam is widened by alteration of the voltages on condenser lens 47, as by a decrease in the amplitude of negative bias furnished to center electrode 50 of lens 47 from bias source 40, the beam may flood a large portion, or all, of the input surface of lense matrix 54. In such event, the segment of the electron beam impinging upon each of the lenslets in the matrix is deflected in symmetrical fashion, so that the pattern traced according to the voltages supplied to each lenslet is repeated on the surface of wafer 10 a number of times equal to the number of lenslets in the path of the electron beam. Since grooves 18 may divide wafer 10 into a number of segments equal to the number of lenslets in matrix 54, parallel readout of identical data is thereupon supplied from each of the segments of wafer 10 upon which a portion of the electron beam impinges.

A Faraday cup 57 is provided in section 53 of enclosure 43 for the purpose of receiving the electron beam from electron emitting means 45 when no exposure of the incident radiation receiving surface on device 9 by the electron beam is called for. During this time, the electron beam is deflected away from the aperture in plate 51 by a pair of deflection plates 36, to the Faraday cup, which is grounded through a beam current meter 58 providing visual indication of beam current flow to the cup. Electrons emitted from electron source 45 thus are collected by the Faraday cup until exposure of device 9 to the electron beam is once again called for. This method of turning the beam on and off, insofar as device 9 is concerned, is highly stable and yet flexible for the purpose of optimizing both exposure spot shape and current produced by the electron beam. Other methods of turning the beam on and off, such as conventional grid modulation, may also be utilized.

Control of the electron beam within enclosure 43 originates with control circuitry 70 which may comprise, for example, the output circuitry of a computer. Control circuitry 70 includes coarse location selection means 71, fine location selection means 72, and read/write beam control means 73. Coarse location selection means 71 produces an output signal which triggers a horizontal staircase counter 74 and a vertical staircase counter 75 into operation. These counters each generate a voltage which increases by equal increments at times controlled by input pulses, and both are resetable upon receipt of a reset signal from coarse location selection means 71. Similarly, fine location selection means 72 produces an output signal which triggers a horizontal staircase counter 76 and a vertical staircase counter 77 into operation. Both counters 76 and 77 are reset upon receipt of a reset signal from fine location selection apparatus 72.

Output signals from horizontal staircase counter 74 are supplied to the centertaps of potentiometers 60 and 62, while output signals from vertical staircase counter 75 are supplied to the centertaps of potentiometers 63 and 61. Output signals from horizontal staircase counter 76 are furnished to vertically-directed electrodes in lens matrix 54 so as to deflect the beam in a horizontal direction, while output signals from vertical staircase counter 77 are supplied to horizontally-directed electrodes in lens matrix 54 so as to deflect the beam in a vertical direction, the horizontal and vertical directions being oriented in the plane of wafer 10. The connections to matrix 54 are described in greater detail in the aforementioned S. P. Newberry application Ser. No. 671,353.

A read or write signal is furnished from read/write circuitry 73 of control apparatus 70 whenever it is desired to impinge the electron beam upon the surface of device 9 for the purpose of recording or reading out information. This signal triggers a standby deflection driver circuit 68 into operation so as to remove a deflection voltage normally supplied therefrom to plates 36 to maintain the electron beam directed into Faraday cup 57. The trigger pulse applied to standby deflection driver 68 causes the deflection driver to remove this deflection voltage for the entire duration of the trigger pulse, permitting the electron beam to move out of Faraday cup 57 and pass through the shaped aperture in plate 51 for this predetermined interval. Upon expiration of this interval, the deflection voltage from deflection driver 68 is restored, and the electron beam is again deflected to Faraday cup 57 by deflection plates 36.

With device 9 divided into segments by grooves 18, as illustrated in FIG. 1, it is desirable to include means for selecting which one or ones of these segments is to produce output signals in the event lens matrix 54 is struck by a flooding electron beam. Thus, a plurality of 2-input AND gates 80, 81, 82 and 83 are provided with one input to each of these gates connected to one segment of wafer 10 respectively. The second input to each of AND gates 80–83 is fulfilled individually from readout selection apparatus 84, which provides facility for selecting a predetermined one or more than one segment of wafer 10 to produce readout signals. The output signals of AND gates 80, 81, 82 and 83 are furnished to utilization means 85, 86, 87 and 88, respectively. Although only four AND gates and four utilization means are illustrated for clarity, there may be as many AND gates and utilization means as there are segments of device 9. Negative bias means for incident radiation receiving surface 15 of wafer 10 is furnished from a bias supply 90.

Writing of data on the coating of wafer 10 is controlled by control circuitry 70, with readout selection apparatus 84 maintaining the second input to each of 2-input AND gates 80, 81, 82 and 83 de-energized. Thus, after coated wafer 10 has been fastened in place within evacuated enclosure 43, and with horizontal staircase counter 74 and vertical staircase counter 75 at their minimum output voltage amplitudes, electron beam 44 impinges upon the first lens of lens matrix 54, such as may be situated in a corner of the matrix. Staircase counters 76 and 77 are similarly at their minimum output voltage amplitudes, so that the fine electron beam emerging from the first lens is directed toward a corner of the surface to be scanned thereby. As output voltage amplitude of horizontal staircase counter 76 incrementally increases in response to pulses received from fine location selection apparatus 72, the fine electron beam emerging from the first lens of matrix 54 is deflected in a horizontal direction across the radiation receiving coating of wafer 10. As described in detail in the aforementioned S. P. Newberry application Ser. No. 671,353, output voltage of counter 76 increases to its maximum amplitude and is reset prior to each incremental advance in output voltage of vertical staircase counter 77. This enables each individual lenslet in lens matrix 54 to sweep a plurality of horizontal lines across a predetermined portion of the surface of device 9 corresponding to the surface area reachable with an electron beam from that individual lenslet, in the form of an array or raster.

Once vertical staircase counter 77 has increased to its maximum output voltage amplitude, the coarse electron beam emerging from electrodes 55 is advanced to the next lenslet in the first horizontal row of matrix 54 because of an incremental advance in output voltage from horizontal staircase counter 74, while vertical staircase counter 75 remains in its minimum output voltage condition. At this time, horizontal staircase counter 76 again increases incrementally in output voltage from its minimum to its maximum amplitude, causing the fine electron beam emerging from lens matrix 54 to sweep one complete horizontal line across the segment of device 9 corresponding to the area illuminated by the second lenslet in the first horizontal row of matrix 54. When horizontal staircase counter 76 has reached its maximum value it is reset and vertical staircase counter 77 is advanced to its first incremental level of output voltage amplitude, which is the second line of data. Horizontal staircase counter 76 again increases to its maximum value and is reset, vertical staircase counter 77 is again advanced in output voltage amplitude by a single increment, etc. In this fashion, a complete raster is scanned by the second lenslet of the first horizontal row of lens matrix 54. Horizontal staircase counter 74 is then advanced to its next output voltage amplitude level, and a raster is scanned by the third lenslet in the horizontal row of the matrix. This same procedure is repeated, until horizontal staircase counter 74 reaches its maximum output voltage amplitude. At this time, the final lenslet in the first horizontal row is scanned through a complete raster by staircase counters 76 and 77, as previously described. Upon completion of this raster scan, staircase counters 74, 76 and 77 are all reset while vertical staircase counter 75 is advanced to its next output voltage amplitude level. At this time, another raster scan is produced by counters 76 and 77, and upon completion of this scan, horizontal staircase counter 74 advances by a single output voltage amplitude increment. In this fashion, the second row of lenslets in matrix 54 produces raster scans in sequence across the surface of device 9, until the second row of raster scans has been completed. At this time, counters 74, 76 and 77 are all reset, and vertical staircase counter 75 is advanced to its next output voltage amplitude level. This entire sequence is repeated until, after counters 74 and 75 and counters 76 and 77 have all reached their maximum count, the entire surface of device 9 has been swept by the fine electron beams emerging from lens matrix 54.

During scanning by horizontal staircase counter 76, standby deflection driver 68 is triggered by read/write circuitry 73 of control apparatus 70, so that the electron beam is present at predetermined positions on the coated surface of wafer 10 and is absent therefrom in other positions. The coating on wafer 10 has then been exposed in accordance with the pattern produced by control circuitry 70. At this time, wafer 10 is removed from enclosure 43 and developed as described in accordance with the description of FIGS. 1 and 2, or FIG. 3, so as to result in a configuration such as illustrated in FIGS. 1 and 2, or FIG. 3, respectively.

After the coating on wafer 10 has been developed, the wafer is again inserted into enclosure 43 and positioned in the precise position it had occupied during the writing operation. To interrogate device 9, electron beam 44 is directed to impinge upon a predetermined lenslet in matrix 54, as by driving counters 74 and 75 to a predetermined count, and the fine electron beam emerging from matrix 54 is precisely positioned on the surface of device 9 by driving counters 76 and 77 to predetermined counts. Standby deflection driver circuit 68 is then triggered, so as to permit the beam to impinge upon the predetermined location on the surface of device 9, as selected by counters 74, 75, 76 and 77. In conjunction with the output voltages of counters 74–77, readout selection apparatus 84 energizes a predetermined one of the second inputs to AND gates 80, 81, 82 and 83, so as to permit energization of the utilization means associated therewith in accordance with the data read out by the electron beam upon impinging on device 9. In this fashion, data may be conveniently retrieved from storage.

Potentiometers 60, 61, 62 and 63 are preferably adjusted so that the beam which is deflected by electrodes 55 and 56 is deflected by the proper amount and impinges orthogonally upon the incident radiation receiving surface of lens matrix 54. If simultaneous readout of a plurality of segments of wafer 10 is desired, a flood beam is made to impinge on the radiation receiving surface of lens matrix 54. This is accomplished by turning off horizontal staircase counter 74 and vertical staircase counter 75, so that no relative voltage exists between any of the plates of deflection means 55 and 56. Bias supply 40 is altered in amplitude so that the beam transmitted by condenser lens 47 is widened to a sufficiently large area to cover the entire surface of device 9 desired to be scanned. Operation of horizontal staircase counter 76 and vertical staircase counter 77 then takes place as previously described. Thus, each of the lenslets of matrix 54 which is illuminated by the flood beam produces a fine beam each time standby deflection driver 68 is triggered by read/write circuitry 73. Consequently, each of the lenslets illuminated by the electron beam operates in parallel, and the segments of wafer 10 which are struck by the electron beam supply data concurrently to the inputs of those of 2-input AND gates 80, 81, 82 and 83 connected to these segments. In this case, readout selection apparatus 84 energizes one or a plurality of the utilization means, as desired.

The foregoing describes a device for storing digital data according to a predetermined pattern of electron beam opacity and transmisivity, and wherein readout is provided by formation of electron-hole pairs in predetermined portions of a semiconductor radiation detector. A data storage and retrieval system is also described wherein an electron beam is selectively impinged upon predetermined regions of a storage device in order to read data into the system and retrieve data therefrom.

While only certain preferred features of the invention have been shown by way of illustration, many modifications and changes will occur to those skilled in the art. It is, therefore, to be understood that the appended claims are inended to cover all such modifications and changes as fall within the true spirit and scope of the invention.

What is claimed is:

1. A data storage device comprising:

a semiconductor radiation detecting wafer having a substantially flat surface to receive incident radiation thereon, said wafer comprising a p-type region of substantially uniform thickness extending beneath the incident radiation receiving surface to a predetermined depth, a surface-adjacent region of p-type material more heavily doped than said other p-type region so as to be highly conductive and an n-type region of substantially uniform thickness extending to a predetermined depth beneath the opposite surface of said wafer so as to leave a depletion region between said p-type and n-type regions, said n-type region having at least one groove extending from the surface of said n-type region into said depletion region;

a radiation absorbing material coated over said incident radiation receiving surface with regions of radiation absorbing material overlying said groove, said absorbing material containing data in the form of a predetermined pattern of holes through which incident radiation is permitted to substantially unobstructedly strike said incident radiation receiving surface; and means for controllably deflecting an electron beam including a coarse electron beam source, coarse electron beam deflection means, and a matrix of fine electron lenses, said matrix of fine electron lenses being situated between said coarse electron beam deflection means and said semiconductor radiation detecting wafer.

2. The data storage device of claim 1 wherein said radiation absorbing material is photopolymerizable.

3. The data storage device of claim 1 wherein said radiation absorbing material comprises gold.

4. The data storage device of claim 1 wherein said radiation absorbing material comprises one of the group consisting of osmium, molybdenum, tantalum, tungsten, hafnium and palladium.

References Cited

UNITED STATES PATENTS

| | | | |
|---|---|---|---|
| 2,589,704 | 3/1952 | Kirkpatrick et al. | 178—51 |
| 2,786,880 | 3/1957 | McKay | 315—8.5X |
| 2,981,891 | 4/1961 | Horton | 315—8.5X |
| 3,015,738 | 1/1962 | Kammerer et al. | 315—8.5X |
| 3,389,382 | 6/1968 | Hart et al. | 346—74X |
| 3,445,715 | 5/1969 | Dombeck | 340—173X |

TERRELL W. FEARS, Primary Examiner

U.S. Cl. X.R.

315—8.5; 346—74